(12) United States Patent
van der Schaar et al.

(10) Patent No.: US 6,501,797 B1
(45) Date of Patent: Dec. 31, 2002

(54) SYSTEM AND METHOD FOR IMPROVED FINE GRANULAR SCALABLE VIDEO USING BASE LAYER CODING INFORMATION

(75) Inventors: Mihaela van der Schaar, Ossining, NY (US); Yingwei Chen, Ossining, NY (US); Hayder Radha, Mahwah, NJ (US)

(73) Assignee: Koninklijke Phillips Electronics N.V., Eindhoven (NL)

( * ) Notice: Subject to any disclaimer, the term of this patent is extended or adjusted under 35 U.S.C. 154(b) by 0 days.

(21) Appl. No.: 09/347,881

(22) Filed: Jul. 6, 1999

(51) Int. Cl.$^7$ ................................................ H04B 14/04
(52) U.S. Cl. ............................ 375/240.12; 375/240.08; 375/240.22; 708/203
(58) Field of Search ........................ 375/240, 240.12, 375/240.08; 708/203; H04N 7/12

(56) References Cited

U.S. PATENT DOCUMENTS 5,742,892 A  * 4/1998 Chaddha ................. 375/240.22
5,852,565 A  * 12/1998 Demos ........................ 708/203

FOREIGN PATENT DOCUMENTS

| EP | 0644695 | A2 | 3/1995 | |
| EP | 0771119 | A2 | 5/1997 | H04N/7/50 |
| EP | 0771119 | A3 | 5/1997 | H04N/7/50 |
| EP | 0786902 | A1 | 7/1997 | |
| EP | 0883300 | A2 | 12/1998 | |
| GB | 2306846 | A | 5/1997 | |
| WO | 9912356 | A1 | 3/1999 | |
| WO | 9933274 | A1 | 7/1999 | H04N/7/26 |

OTHER PUBLICATIONS

PHA 23, 726, U.S. Ser. No. 09/347,882, Filed: Jul. 6, 1999.
NG S –B et al: "Two–Tier DPCM CODEC for Videoconferencing" IEEE Transactions on Communications, US, IEE Inc. New York vol. 37, No. 4, Apr. 1, 1999, pp. 380–386.
Bosveld F et al: "Hierarchical Coding of HDTV" Signal Processing Image Communication, NL, Elsevier Science Publishers, Amsterdam vol. 4, No. 3, Jun. 1, 1992, pp. 195–225.

* cited by examiner

*Primary Examiner*—Howard Britton
(74) *Attorney, Agent, or Firm*—Daniel J. Piotrowski

(57) ABSTRACT

There is disclosed an apparatus for controlling the transmission of enhancement layer video data for use in a video encoder containing a base layer encoder and an enhancement layer encoder. The base layer encoder receives input video frames and generates compressed base layer video frames suitable for transmission at a base layer bit rate to a streaming video receiver. The enhancement layer encoder compares the input video frames and a processed version of the compressed base layer video frames and generates enhancement layer video data suitable for transmission at a modifiable enhancement layer bit rate to the streaming video receiver. The apparatus comprises a base layer parameter monitor for receiving at least one base layer parameter and, in response thereto, modifying an allocation of the enhancement layer video data among corresponding ones of the compressed base layer video frames.

21 Claims, 4 Drawing Sheets

SYSTEM AND METHOD FOR IMPROVED FINE GRANULAR SCALABLE VIDEO USING BASE LAYER CODING INFORMATION

CROSS-REFERENCE TO RELATED APPLICATIONS

The present invention is related to that disclosed in United States patent application Ser. No. 09/347,882), entitled "SYSTEM AND METHOD FOR FINE GRANULAR SCALABLE VIDEO WITH SELECTIVE QUALITY ENHANCEMENT," which is being filed concurrently herewith and is commonly assigned to the assignee of the present invention. The disclosure of the related patent application is incorporated herein by reference for all purposes as if fully set forth herein.

TECHNICAL FIELD OF THE INVENTION

The present invention is directed, in general, to video encoding systems and, more specifically, to an encoding system for streaming video data.

BACKGROUND OF THE INVENTION

Real-time streaming of multimedia content over data networks, including the Internet, has become an increasingly common application in recent years. A wide range of interactive and non-interactive multimedia applications, such as news-on-demand, live network television viewing, video conferencing, among others, rely on end-to-end streaming video techniques. Unlike a "downloaded" video file, which may be retrieved first in "non-real" time and viewed or played back later in "real" time, streaming video applications require a video transmitter that encodes and transmits a video signal over a data network to a video receiver, which must decode and display the video signal in real time.

Scalable video coding is a desirable feature for many multimedia applications and services that are used in systems employing decoders with a wide range of processing power. Scalability allows processors with low computational power to decode only a subset of the scalable video stream. Another use of scalable video is in environments with a variable transmission bandwidth. In those environments, receivers with low-access bandwidth receive, and consequently decode, only a subset of the scalable video stream, where the amount of that subset is proportional to the available bandwidth.

Several video scalability approaches have been adopted by lead video compression standards such as MPEG-2 and MPEG-4. Temporal, spatial, and quality (e.g., signal-noise ratio (SNR)) scalability types have been defined in these standards. All of these approaches consist of a base layer (BL) and an enhancement layer (EL). The base layer part of the scalable video stream represents, in general, the minimum amount of data needed for decoding that stream. The enhanced layer part of the stream represents additional information, and therefore enhances the video signal representation when decoded by the receiver.

For example, in a variable bandwidth system, such as the Internet, the base layer transmission rate may be established at the minimum guaranteed transmission rate of the variable bandwidth system. Hence, if a subscriber has a minimum guaranteed bandwidth of 256 kbps, the base layer rate may be established at 256 kbps also. If the actual available bandwidth is 384 kbps, the extra 128 kbps of bandwidth may be used by the enhancement layer to improve on the basic signal transmitted at the base layer rate.

For each type of video scalability, a certain scalability structure is identified. The scalability structure defines the relationship among the pictures of the base layer and the pictures of the enhanced layer. One class of scalability is fine-granular scalability. Images coded with this type of scalability can be decoded progressively. In other words, the decoder may decode and display the image with only a subset of the data used for coding that image. As more data is received, the quality of the decoded image is progressively enhanced until the complete information is received, decoded, and displayed.

The newly proposed MPEG-4 standard is directed to new video streaming applications based on very low bit rate coding, such as video-phone, mobile multimedia and audio-visual communications, multimedia e-mail, remote sensing, interactive games, and the like. Within the MPEG-4 standard, fine-granular scalability (FGS) has been recognized as an essential technique for networked video distribution. FGS primarily targets applications where video is streamed over heterogeneous networks in real-time. It provides bandwidth adaptivity by encoding content once for a range of bit rates, and enabling the video transmission server to change the transmission rate dynamically without in-depth knowledge or parsing of the video bit stream.

An important priority within conventional FGS techniques is improving coding efficiency and visual quality of the intra-frame coded enhancement layer. This is necessary to justify the adoption of FGS techniques for the compression of the enhancement layer in place of non-scalable (e.g., single layer) or less granular (e.g., multi-level SNR scalability) coding methods.

A limitation of the compression scheme currently adopted as reference for FGS resides in its inability to exploit the base layer coding information for improving the compression efficiency of the enhancement-layer. Another disadvantage of currently adopted FGS schemes resides in the fact that enhancement layer frames are coded independently of each other (i.e., "intra" coding of frames). The intra-frame coding of the enhancement layer is necessary for error resilience and for easy bit rate change at transmission time. However, because each enhancement frame is optimally coded in its own context, discontinuity or inconsistency between the image quality of consecutive frames is often introduced. The resulting FGS enhanced video may have "flashing" artifacts across frames. This is particular annoying and highly visible when compared to the more "visually stable" single layer coded video.

There is therefore a need in the art for improved encoders and encoding techniques for use in streaming video systems. There is a further need for encoders and encoding techniques that are less susceptible to flashing artifacts and other sources of discontinuity in the quality of consecutive frames in a sequence of related frames. In particular there is a need in the art for encoders that selectively allocate the enhancement layer data in relation to the amount of activity or selected characteristics in the original video image.

SUMMARY OF THE INVENTION

To address the above-discussed deficiencies of the prior art, it is a primary object of the present invention to provide a new technique for improving the coding efficiency of the enhancement layer compression scheme. The proposed encoding technique uses one or more parameters taken from the base layer compression information (e.g., motion vectors, base layer quantization errors, rate-control info, etc.) to improve the image quality of the enhancement layer.

Moreover, based on the observation that single layer encoding usually does a good job in optimizing video quality for particular bit rates, the present invention may use single layer coding at multiple bit rates as "guidelines" for FGS encoding. The new compression techniques may be applied independent of the transforms chosen in the base and enhancement layers (e.g., discrete cosine transform (DCT) or wavelets). However, the use of certain base layer or single-layer information is less straightforward if different coding schemes are employed at the base and enhancement layers.

Accordingly, in an advantageous embodiment of the present invention, there is provided, for use in a video encoder comprising a base layer circuit capable of receiving an input stream of video frames and generating therefrom compressed base layer video frames suitable for transmission at a base layer bit rate to a streaming video receiver and an enhancement layer circuit capable of receiving the input stream of video frames and a decoded version of the compressed base layer video frames and generating therefrom enhancement layer video data associated with, and allocated to, corresponding ones of the compressed base layer video frames and suitable for transmission at a modifiable enhancement layer bit rate to the streaming video receiver an apparatus for controlling transmission of the enhancement layer video data. The apparatus comprises a base layer parameter monitor capable of receiving at least one base layer parameter and, in response thereto, modifying an allocation of the enhancement layer video data among the corresponding ones of the compressed base layer video frames.

In one embodiment of the present invention, the video encoder comprises a motion estimation circuit capable of receiving the input stream of video frames and determining therefrom a base layer motion parameter associated with at least one selected frame sequence in the input stream of video frames.

In another embodiment of the present invention, the base layer parameter monitor receives the base layer motion parameter and, in response thereto, modifies the allocation of the enhancement layer video data according to a level of motion in the at least one selected frame sequence indicated by the base layer motion parameter.

In still another embodiment of the present invention, the video encoder comprises a quantization circuit capable of receiving and quantizing transform data associated with the input stream of video frames to thereby reduce a size of the transform data and further capable of determining a base layer quantization error parameter associated with the quantized transform data.

In a further embodiment of the present invention, the base layer parameter monitor receives the base layer quantization error parameter and, in response thereto, modifies the allocation of the enhancement layer video data according to a quantization error indicated by the base layer quantization error parameter.

In a still further embodiment of the present invention, the video encoder comprises a base layer rate allocation circuit capable of determining the base layer bit rate, wherein the base layer bit rate is set at a pre-determined minimum rate at which the compressed base layer video frames are transmitted to the streaming video receiver, and generating therefrom a base layer bit rate parameter associated with the base layer bit rate.

In a yet further embodiment of the present invention, the base layer parameter monitor receives the base layer bit rate parameter and, in response thereto, modifies the allocation of the enhancement layer video data according to an estimated difference between the compressed base layer video frames and estimated compressed base layer video frames associated with a second base layer bit rate greater than the pre-determined minimum rate.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged video encoder.

Figure 1:
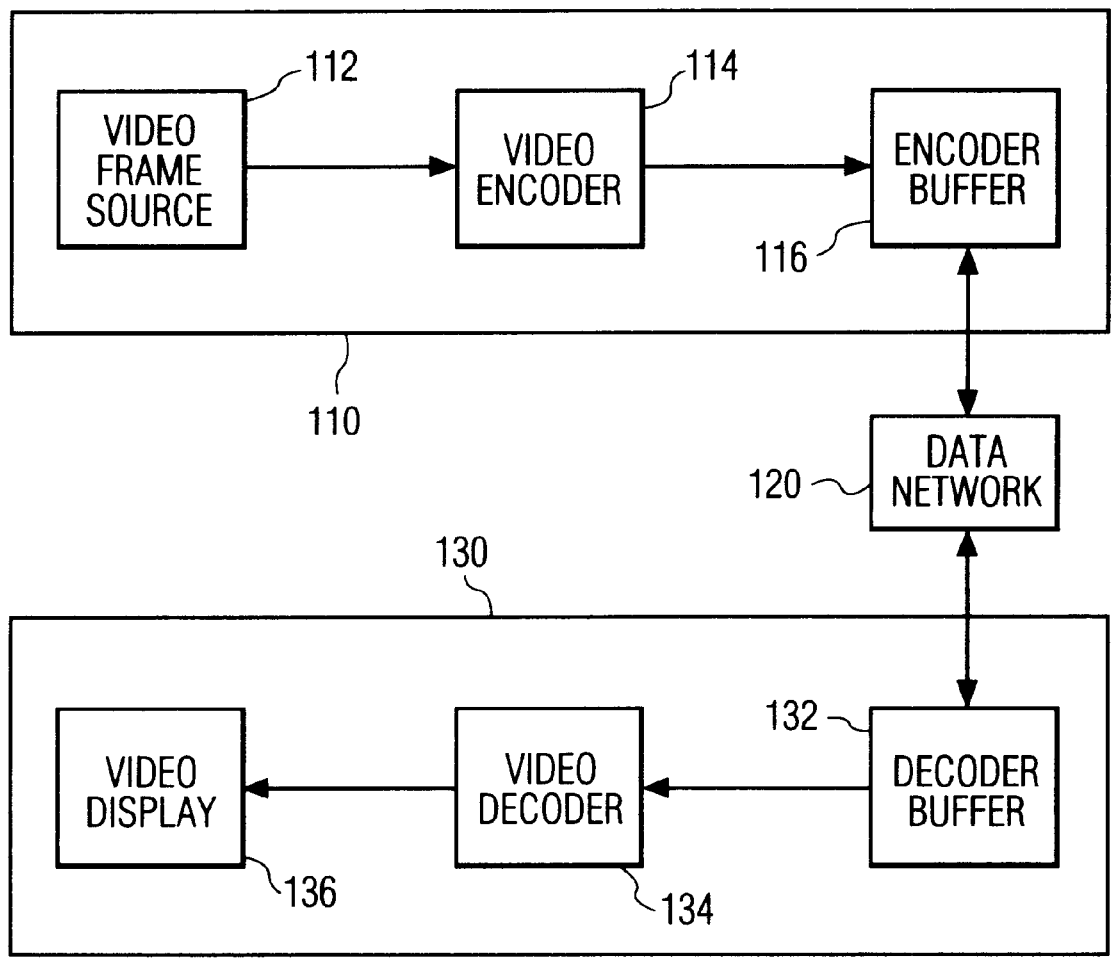
FIG. 1 illustrates an end-to-end transmission of streaming video from a streaming video transmitter through a data network to a streaming video receiver, according to one embodiment of the present invention.

FIG. 1 illustrates an end-to-end transmission of streaming video from streaming video transmitter 110 through data network 120 to streaming video receiver 130, according to one embodiment of the present invention. Depending on the application, streaming video transmitter 110 may be any one of a wide variety of sources of video frames, including a data network server, a television station, a cable network, a desktop personal computer (PC), or the like.

Streaming video transmitter 110 comprises video frame source 112, video encoder 114 and recoder buffer 116. Video frame source 112 may be any device capable of generating a sequence of uncompressed video frames, including a television antenna and receiver unit, a video cassette player, a video camera, a disk storage device capable of storing a "raw" video clip, and the like. The uncompressed video frames enter video encoder 114 at a given picture rate (or "streaming rate") and are compressed according to any known compression algorithm or device, such as an MPEG-4 encoder. Video encoder 114 then transmits the compressed video frames to encoder buffer 116 for buffering in preparation for transmission across data network 120. Data network 120 may be any suitable network and may include portions of both public data networks, such as the Internet, and private data networks, such as an enterprise-owned local area network (LAN) or wide area network (WAN).

Streaming video receiver 130 comprises decoder buffer 132, video decoder 134 and video display 136. Decoder buffer 132 receives and stores streaming compressed video frames from data network 120. Decoder buffer 132 then transmits the compressed video frames to video decoder 134 as required. Video decoder 134 decompresses the video frames at the same rate (ideally) at which the video frames were compressed by video encoder 114. Video decoder 134 sends the decompressed frames to video display 136 for play-back on the screen of video display 134.

Figure 2:
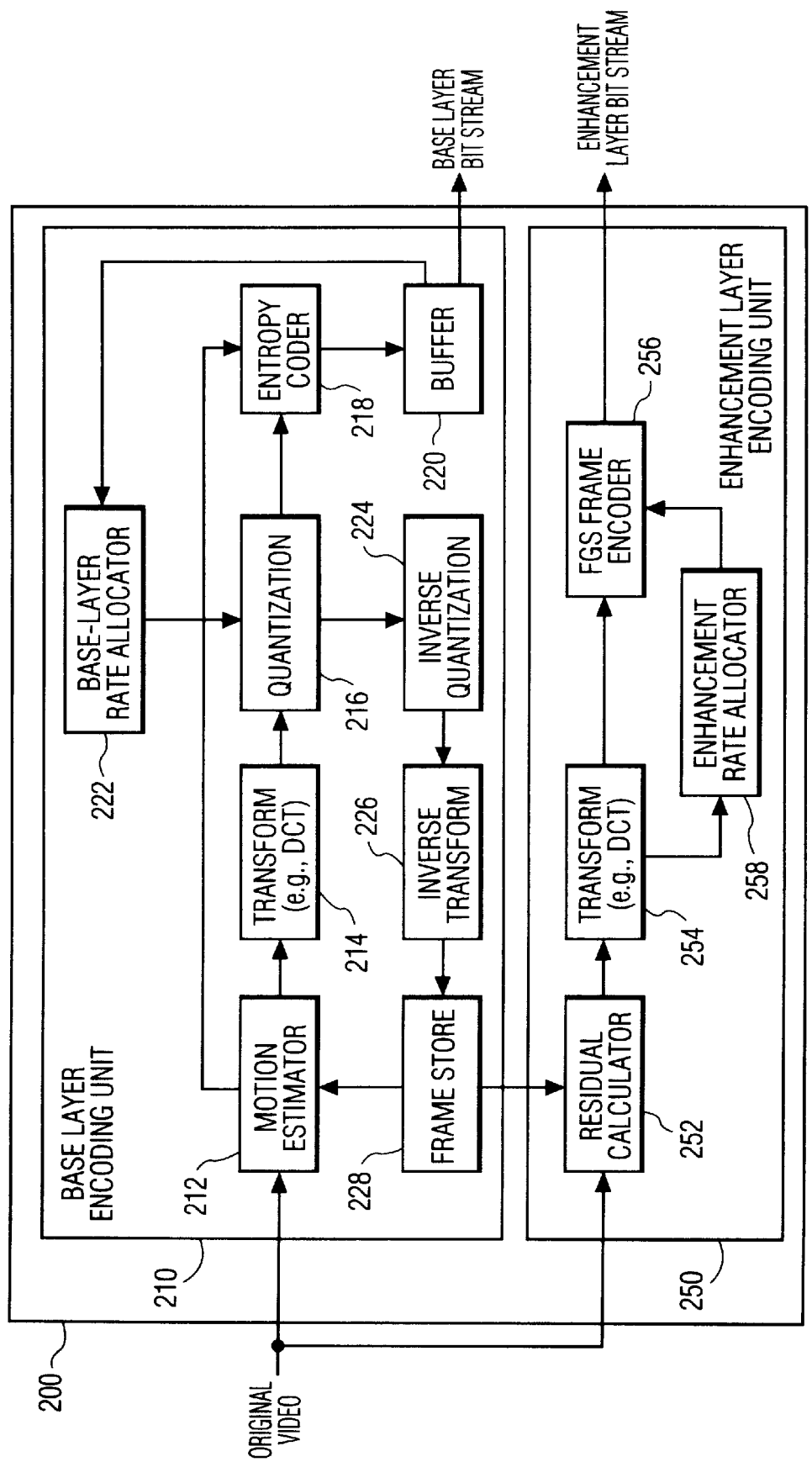
FIG. 2 illustrates a video encoder in accordance with one embodiment of the prior art.

FIG. 2 illustrates video encoder 200 in accordance with one embodiment of the prior art. Video encoder 200 comprises base layer encoding unit 210 and enhancement layer encoding unit 250. Video encoder 200 receives an original video signal that is transferred to base layer encoding unit 210 for generation of a base layer bit stream and to enhancement layer encoding unit 250 for generation of an enhancement layer bit stream.

Base layer encoding unit 210 contains a main processing branch, comprising motion estimator 212, transform circuit 214, quantization circuit 216, entropy coder 218, and buffer 220, that generates the base layer bit stream. Base layer encoding unit 210 comprises base layer rate allocator 222, which is used to adjust the quantization factor of base layer encoding unit 210. Base layer encoding unit 210 also contains a feedback branch comprising inverse quantization circuit 224, inverse transform circuit 226, and frame store circuit 228.

Motion estimator 212 receives the original video signal and estimates the amount of motion between a reference frame and the present video frame as represented by changes in pixel characteristics. For example, the MPEG standard specifies that motion information may be represented by one to four spatial motion vectors per 16x16 sub-block of the frame. Transform circuit 214 receives the resultant motion difference estimate output from motion estimator 212 and transforms it from a spatial domain to a frequency domain using known de-correlation techniques, such as discrete cosine transform (DCT).

Quantization circuit 216 receives the DCT coefficient outputs from transform circuit 214 and a scaling factor from base layer rate allocator circuit 322 and further compresses the motion compensation prediction information using well-known quantization techniques. Quantization circuit 216 utilizes the scaling factor from base layer rate allocator circuit 222 to determine the division factor to be applied for quantization of the transform output. Next, entropy coder circuit 218 receives the quantized DCT coefficients from quantization circuit 216 and further compresses the data using variable length coding techniques that represent areas with a high probability of occurrence with a relatively short code and that represent areas of lower probability of occurrence with a relatively long code.

Buffer 220 receives the output of entropy coder 218 and provides necessary buffering for output of the compressed base layer bit stream. In addition, buffer 220 provides a feedback signal as a reference input for base layer rate allocator 222. Base layer rate allocator 222 receives the feedback signal from buffer 220 and uses it in determining the division factor supplied to quantization circuit 216.

Inverse quantization circuit 224 de-quantizes the output of quantization circuit 216 to produce a signal that is representative of the transform input to quantization circuit 216. Inverse transform circuit 226 decodes the output of inverse quantization circuit 224 to produce a signal which provides a frame representation of the original video signal as modified by the transform and quantization processes. Frame store circuit 228 receives the decoded representative frame from inverse transform circuit 226 and stores the frame as a reference output to motion estimator circuit 212 and enhancement layer encoding unit 250. Motion estimator circuit 212 uses the resultant stored frame signal as the input reference signal for determining motion changes in the original video signal.

Enhancement layer encoding unit 250 contains a main processing branch, comprising residual calculator 252, transform circuit 254, and fine granular scalability (FGS) encoder 256. Enhancement layer encoding unit 250 also comprises enhancement rate allocator 258. Residual calculator circuit 252 receives frames from the original video signal and compares them with the decoded (or reconstructed) base layer frames in frame store 228 to produce a residual signal representing image information which is missing in the base layer frames as a result of the transform and quantization processes. The output of residual calculator circuit 252 is known as the residual data or residual error data.

Transform circuit 254 receives the output from residual calculator 252 and compresses this data using a known transform technique, such as DCT. Though DCT serves as the exemplary transform for this implementation, transform circuit 254 is not required to have the same transform process as base layer transform 214.

FGS frame encoder circuit 256 receives outputs from transform circuit 254 and enhancement rate allocator 258. FGS frame encoder 256 encodes and compresses the DCT coefficients as adjusted by enhancement rate allocator 258 to produce the compressed output for the enhancement layer bit stream. Enhancement rate allocator 258 receives the DCT coefficients from transform circuit 254 and utilizes them to produce a rate allocation control that is applied to FGS frame encoder circuit 256.

The prior art implementation depicted in FIG. 2 results in an enhancement layer residual compressed signal that is representative of the difference between the original video signal and the decoded base layer data, with all residuals being processed without regard to the internal parameters of base layer encoding unit 310. The present invention, as described below, uses one or more parameters taken from the base layer (e.g., motion vectors, base layer quantization errors, rate-control information, etc.) to improve the operation of the enhancement layer. The new compression techniques may be applied independent of the transforms (e.g., discrete cosine transform (DCT) or wavelets) chosen in the base and enhancement layers.

Figure 3:
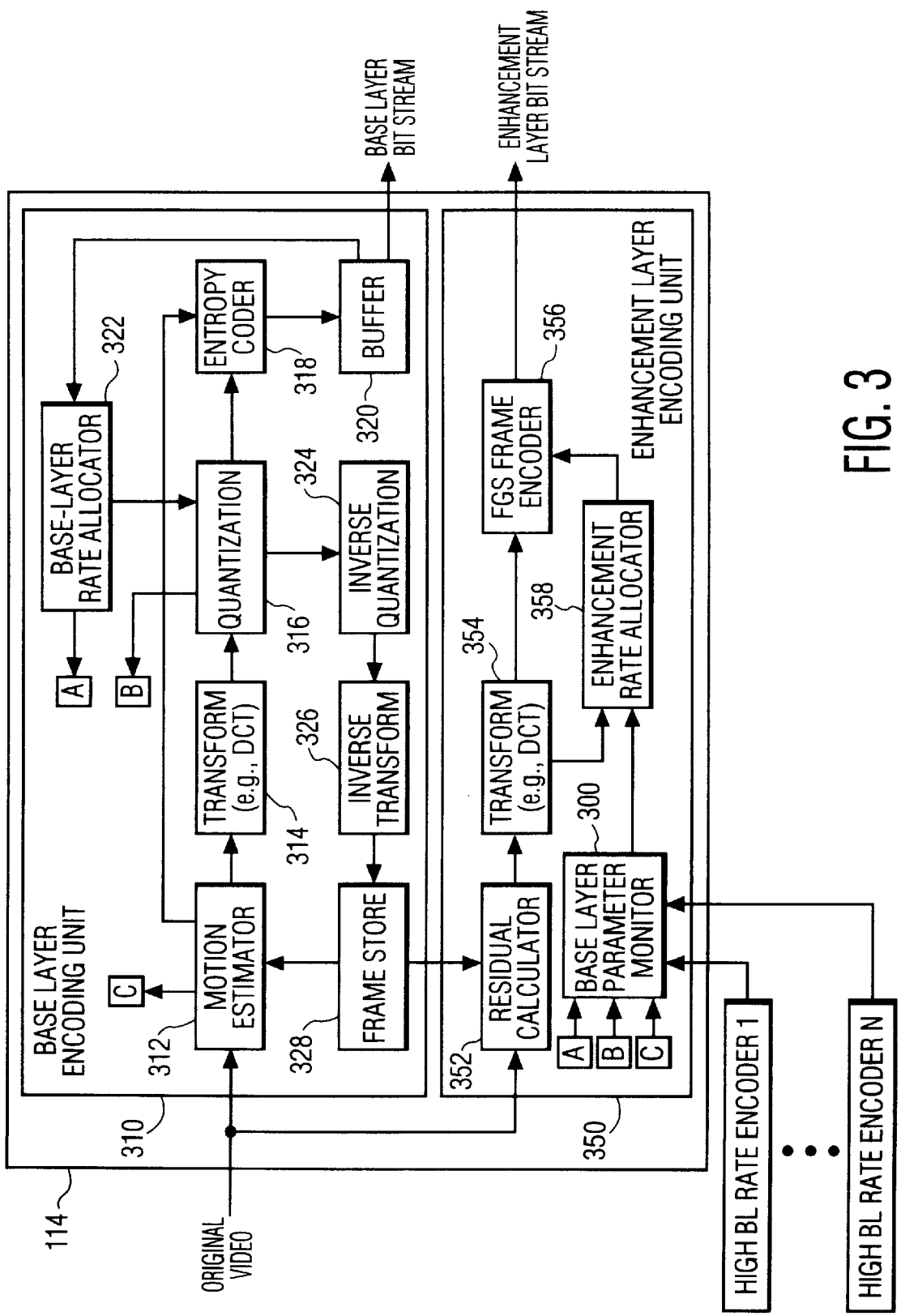
FIG. 3 illustrates an exemplary video encoder in accordance with one embodiment of the present invention.

FIG. 3 illustrates video encoder 114 in greater detail in accordance with one embodiment of the present invention. For the most part, video encoder 114 is similar to prior art video encoder 200. Video encoder 114 comprises base layer encoding unit 310 and enhancement layer encoding unit 350. Video encoder 114 receives an original video signal that is transferred to base layer encoding unit 310 for generation of a base layer bit stream and to enhancement layer encoding unit 350 for generation of an enhancement layer bit stream.

Base layer encoding unit 310 contains a main processing branch, comprising motion estimator 312, transform circuit 314, quantization circuit 316, entropy coder 318, and buffer 320, that generates the base layer bit stream. Base layer encoding unit 310 also comprises base layer rate allocator 322, which is used to allocate the base layer data from base layer encoding unit 310. Base layer encoding unit 310 also contains a feedback branch comprising inverse quantization circuit 324, inverse transform circuit 326, and frame store circuit 328.

Enhancement layer encoding unit 350 contains a main processing branch, comprising residual calculator 352, transform circuit 354, and fine granular scalability (FGS) encoder 356. Enhancement layer encoding unit 350 also comprises enhancement layer rate allocator 358.

However, unlike prior art video encoder 200, enhancement layer encoding unit 350 in video encoder 114 also comprises base layer parameter monitor 300. The labels A, B, and C in base layer encoding unit 310 and enhancement layer encoding unit 350 represent signal lines that interconnect components in base layer encoding unit 310 with components in enhancement layer encoding unit 350. The signals lines are omitted for clarity. As label A indicates, exemplary base layer parameter monitor 300 may receive one or more base layer bit rate parameters from base layer rate allocator 322. As label B indicates, exemplary base layer parameter monitor 300 also may receive one or more base layer quantization error parameters from quantization circuit 316. Finally, as label C indicates, exemplary base layer parameter monitor 300 may receive one or more bases layer motion parameters from motion estimator 312.

In a server environment containing multiple encoders operating a different base layer rates, base layer parameter monitor 300 may also receive one or more base layer parameters from one or more of N other base layer encoders, arbitrarily labeled "High BL Rate Encoder 1" through "High BL Rate Encoder N," that operate at higher rates that base layer rate allocator 322.

Base layer parameter monitor 300 utilizes the base layer parameters from base layer encoding unit 310 and High BL Rate Encoders 1-N as reference signals to generate one or more output signals that control the operation of enhancement rate allocator 358. The output signals from base layer parameter monitor 300 adjust or modify the operation of enhancement rate allocator circuit 358 by re-allocating the way the enhancement layer data are distributed among block, groups of blocks, and frames in the base layer.

In an alternate embodiment of the present invention, base layer parameter monitor 300 may also comprise comparator circuitry capable of receiving base layer frames from one or more of the N other base layer encoders that operate at higher rates that base layer encoding unit 310 and comparing them to the base layer frames in base layer encoding unit 310. Base layer parameter monitor 300 produces from these inputs a base layer difference signal that is used as a base layer parameter to adjust or modify the operation of enhancement rate allocator circuit 358 by re-allocating the way the enhancement layer data are distributed among block, groups of blocks, and frames in the base layer.

It should be noted that the base layer parameters described above are exemplary only and not exhaustive. They should not be construed to exclude utilization of other base layer parameter signals suitable for improvements to enhancement layer video bit streams.

Enhancement rate allocator circuit 358 receives parameter output signal(s) from base layer parameter monitor 300 and an output from transform circuit 354. Enhancement rate allocator 358 utilizes the received transform and parameter signals as the basis for developing the rate allocation output to FGS frame encoder circuit 356.

Enhancement layer encoding unit 350 utilizes one or more of the base layer parameters and/or base layer rate encoder outputs to develop an improved enhancement layer bit stream that exploits the human eye's sensitivity to certain types of visual errors. For instance, enhancement layer encoding unit 350 may use base layer bit rate parameter as a guide for allocating additional bits within a particular video frame or between two or more video frames so that the image quality locally or globally approaches the quality of a system that is operating at a higher transmission rate. The resulting image provides a perceptually better image quality. A similar process may be used to insure more consistent image quality between consecutive frames.

In a similar manner, enhancement layer encoding unit 350 may use the base layer quantization error parameter as the means for classifying residual errors introduced by the base layer quantization process. FGS frame encoder circuit 356 then improves the resultant visual image by adding bits as compensation for the identified residual error class. Moreover, enhancement layer encoding unit 350 may minimize inter-block distortions introduced by the quantization process by assigning different transmission priorities to the various residual coefficients. Enhancement layer encoding unit 350 uses the resultant prioritized residual coefficients as the basis for reconstructing a perceptually more pleasing low bit rate image, which is characterized by smoother inter-block transitions.

Enhancement layer encoding unit 350 may use the base layer motion parameter as the basis for classifying images by the degree of motion between frames, with the motion classification determining the amount of compression for particular images. Since discrepancies in images which are moving rapidly are less visible to the human eye, FGS frame encoder 356 may increase the compression of data representing rapidly moving images by decreasing the number of bits that represent the image. Conversely, FGS frame encoder 356 may allocate more bits for areas with slow or little motion, thus improving the visual perception of these images.

Base layer bit rate parameters received from High BL Rate Encoders 1-N provide an extension of the enhancement capability provided by the internal base layer bit rate parameter received from base layer encoding unit 310. Base layer parameter monitor 300 monitors the base layer bit rate parameters of High BL Rate Encoders 1-N and uses the information to provide an output representing the best compromise for image quality and rate. Enhancement rate allocator 358 uses the output of base layer parameter monitor 300 to adjust the transform data received by FGS frame encoder 356.

A specific embodiment may be realized by performing and recording additional single-layer encoding sessions at incremental bit-rates and subsequently reusing these reconstructed signals as guidelines for rate allocation at the enhancement layer. The video is first encoded at the targeted base layer bit rate. Next, additional encoding sessions are performed at incremental bit rates, and the reconstructed signals for all the incremental encoding sessions are recorded.

The selected number of redundant single-layer encoding sessions should be a good trade-off between increased visual quality and consistency and the associated complexity. However, in the case the encoding is performed off-line and the encoder complexity is not a major constraint in the over-all system design, a larger number of redundant single-layer coding cycles could be tolerated.

An important component in the presented improvement is formed by the encoder/decoder synchronization. The choices made at encoding time should be possible to reproduce at the decoder for adequate reconstruction. For example, if certain regions of the picture are coded differently (e.g., get a higher priority), the form and location of the particular region-of-interest should be transmitted to the decoder as side information. However, transmitting this side information (i.e., encoder choices) leads to an additional coding overhead. Therefore, an alternative is to define a mutual agreement between the encoder and decoder, based on, for example, base-layer information, such that the choices made by the enhancement encoder are similarly reproduced by the enhancement decoder without requiring additional side (synchronization) information transmission. An example, where the encoder and decoder can be synchronized without the transmission of side information, can be based on the motion vectors already transmitted for the base-layer reconstruction (see above) or a particular object segmentation which can be performed on the decoded version of the base-layer picture, which the encoder and decoder both have available.

Figure 4:
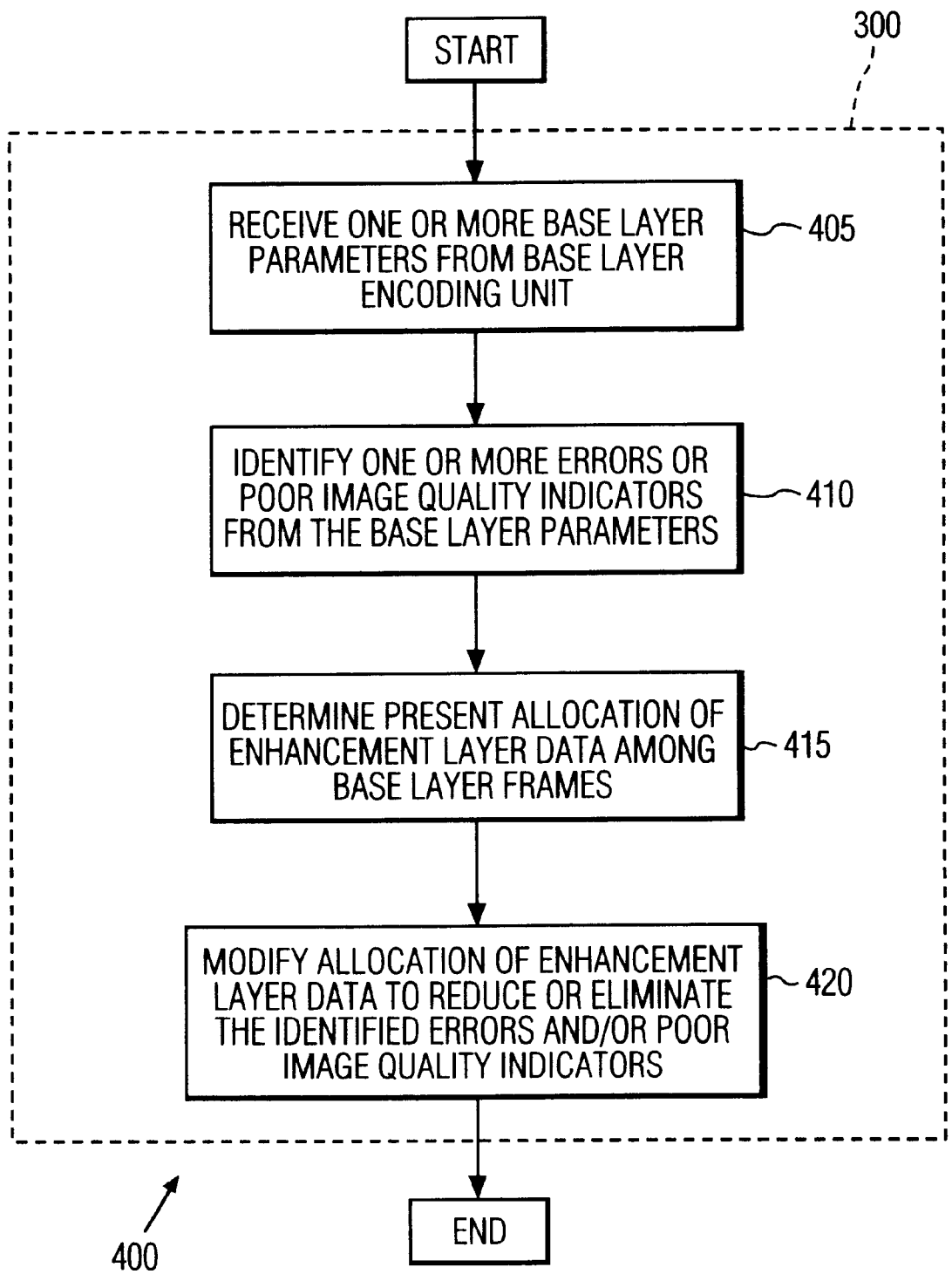
FIG. 4 is a flow diagram illustrating the operation of an exemplary video encoder in accordance with one embodiment of the present invention.

FIG. 4 is a flow diagram 400 illustrating the operation of exemplary video encoder 114 in accordance with one embodiment of the present invention. Base layer parameter monitor 300 receives one or more base layer parameters from base layer encoding unit 310 or from High BL Rate Encoders 1-N (process step 405). The base layer parameters may comprise one or more of a base layer bit rate parameter, a base layer quantization error parameter, a base layer motion parameter C, or other possible descriptive parameters.

Base layer parameter monitor 300 uses the base layer parameters to identify (or classify) one or more errors or poor image quality indicators, including visual masking factors, in the base layer (process step 410). Base layer parameter monitor 300 also determines the present allocation of enhancement layer data with respect to the base layer frames and blocks within the base layer frame (process step 415). Finally, base layer parameter monitor 300 controls enhancement rate allocator 358 in such as way as to modify the allocation of the enhancement layer data among the pixels blocks and frames of the base layer data. This results in a reduction or elimination of identified errors and/or poor image quality indicators (per step 420). The resultant output of FGS frame encoder 356 provides an enhancement layer bit stream which has been perceptually improved through the use of base layer parameter-based discrimination techniques.

Although the present invention has been described in detail, those skilled in the art should understand that they can make various changes, substitutions and alterations herein without departing from the spirit and scope of the invention in its broadest form.

What is claimed is:

1. For use in a video encoder comprising: 1) a base layer circuit capable of receiving an input stream of video frames and generating therefrom compressed base layer video frames suitable for transmission at a base layer bit rate to a streaming video receiver, and 2) an enhancement layer circuit capable of receiving said input stream of video frames and a decoded version of said compressed base layer video frames and generating therefrom enhancement layer video data associated with, and allocated to, corresponding ones of said compressed base layer video frames and suitable for transmission at a modifiable enhancement layer bit rate to said streaming video receiver, an apparatus for controlling transmission of said enhancement layer video data comprising:

a base layer parameter monitor capable of receiving at least one base layer parameter and, in response thereto, developing a rate allocation output and modifying an allocation of said enhancement layer video data among said corresponding ones of said compressed base layer video frames.

2. The apparatus set forth in claim 1 wherein said video encoder comprises a motion estimation circuit capable of receiving said input stream of video frames and determining therefrom a base layer motion parameter associated with at least one selected frame sequence in said input stream of video frames.

3. The apparatus set forth in claim 2 wherein said base layer parameter monitor receives said base layer motion parameter and, in response thereto, modifies said allocation of said enhancement layer video data according to a level of motion in said at least one selected frame sequence indicated by said base layer motion parameter.

4. The apparatus set forth in claim 1 wherein said video encoder comprises a quantization circuit capable of receiving and quantizing transform data associated with said input stream of video frames to thereby reduce a size of said transform data and further capable of determining a base layer quantization error parameter associated with said quantized transform data.

5. The apparatus set forth in claim 4 wherein said base layer parameter monitor receives said base layer quantization error parameter and, in response thereto, modifies said allocation of said enhancement layer video data according to a quantization error indicated by said base layer quantization error parameter.

6. The apparatus set forth in claim 1 wherein said video encoder comprises a base layer rate allocation circuit capable of determining said base layer bit rate, wherein said base layer bit rate is set at a pre-determined minimum rate at which said compressed base layer video frames are transmitted to said streaming video receiver, and generating therefrom a base layer bit rate parameter associated with said base layer bit rate.

7. The apparatus set forth in claim 6 wherein said base layer parameter monitor receives said base layer bit rate parameter and, in response thereto, modifies said allocation of said enhancement layer video data according to an estimated difference between said compressed base layer video frames and estimated compressed base layer video frames associated with a second base layer bit rate greater than said pre-determined minimum rate.

8. For use in a data network comprising a plurality of nodes capable of receiving streaming video data, a streaming video transmitter capable of transmitting said streaming video data to one or more of said nodes, said streaming video transmitter comprising:

a video frame source capable of generating an original stream of video frames; and a video encoder comprising:

a base layer circuit capable of receiving said original stream of video frames and generating therefrom compressed base layer video frames suitable for transmission at a base layer bit rate to said one or more of said nodes;

an enhancement layer circuit capable of receiving said original stream of video frames and a decoded version of said compressed base layer video frames, developing a rate allocation output and generating therefrom enhancement layer video data associated with, and allocated to, corresponding ones of said compressed base layer video frames and suitable for transmission at a modifiable enhancement layer bit rate to said one or more of said nodes; and an apparatus for controlling transmission of said enhancement layer video data comprising a base layer parameter monitor capable of receiving at least one base layer parameter and, in response thereto, developing a rate allocation output and modifying an allocation of said enhancement layer video data among said corresponding ones of said compressed base layer video frames.

9. The streaming video transmitter set forth in claim 8 wherein said video encoder comprises a motion estimation circuit capable of receiving said input stream of video frames and determining therefrom a base layer motion parameter associated with at least one selected frame sequence in said input stream of video frames.

10. The streaming video transmitter set forth in claim 9 wherein said base layer parameter monitor receives said base layer motion parameter and, in response thereto, modifies said allocation of said enhancement layer video data according to a level of motion in said at least one selected frame sequence indicated by said base layer motion parameter.

11. The streaming video transmitter set forth in claim 8 wherein said video encoder comprises a quantization circuit capable of receiving and quantizing transform data associated with said input stream of video frames to thereby reduce a size of said transform data and further capable of determining a base layer quantization error parameter associated with said quantized transform data.

12. The streaming video transmitter set forth in claim 11 wherein said base layer parameter monitor receives said base layer quantization error parameter and, in response thereto, modifies said allocation of said enhancement layer video data according to a quantization error indicated by said base layer quantization error parameter.

13. The streaming video transmitter set forth in claim 8 wherein said video encoder comprises a base layer rate allocation circuit capable of determining said base layer bit rate, wherein said base layer bit rate is set at a pre-determined minimum rate at which said compressed base layer video frames are transmitted to said streaming video receiver, and generating therefrom a base layer bit rate parameter associated with said base layer bit rate.

14. The streaming video transmitter set forth in claim 13 wherein said base layer parameter monitor receives said base layer bit rate parameter and, in response thereto, modifies said allocation of said enhancement layer video data according to an estimated difference between said compressed base layer video frames and estimated compressed base layer video frames associated with a second base layer bit rate greater than said pre-determined minimum rate.

15. For use in a video encoder comprising: 1) a base layer circuit capable of receiving an input stream of video frames and generating therefrom compressed base layer video frames suitable for transmission at a base layer bit rate to a streaming video receiver, and 2) an enhancement layer circuit capable of receiving the input stream of video frames and a decoded version of the compressed base layer video frames and generating therefrom enhancement layer video data associated with, and allocated to, corresponding ones of the compressed base layer video frames and suitable for transmission at a modifiable enhancement layer bit rate to the streaming video receiver, a method for controlling a transmission of the enhancement layer video data comprising the steps of:

monitoring at least one base layer parameter; and in response to a value of the monitored at least one base layer parameter, developing a rate allocation output and modifying an allocation of the enhancement layer video data among the corresponding ones of the compressed base layer video frames.

16. The method set forth in claim 15 wherein the video encoder comprises a motion estimation circuit capable of receiving the input stream of video frames and determining therefrom a base layer motion parameter associated with at least one selected frame sequence in the input stream of video frames.

17. The method set forth in claim 16 further comprising the steps of monitoring the base layer motion parameter and, in response thereto, modifying the allocation of the enhancement layer video data according to a level of motion in the at least one selected frame sequence indicated by the base layer motion parameter.

18. The method set forth in claim 15 wherein the video encoder comprises a quantization circuit capable of receiving and quantizing transform data associated with the input stream of video frames to thereby reduce a size of the transform data and further capable of determining a base layer quantization error parameter associated with the quantized transform data.

19. The method set forth in claim 18 further comprising the steps of monitoring the base layer quantization error parameter and, in response thereto, modifying the allocation of the enhancement layer video data according to a quantization error indicated by the base layer quantization error parameter.

20. The method set forth in claim 15 wherein the video encoder comprises a base layer rate allocation circuit capable of determining the base layer bit rate, wherein the base layer bit rate is set at a pre-determined minimum rate at which the compressed base layer video frames are transmitted to the streaming video receiver, and generating therefrom a base layer bit rate parameter associated with the base layer bit rate.

21. The method set forth in claim 20 further comprising the steps of monitoring the base layer bit rate parameter and, in response thereto, modifying the allocation of the enhancement layer video data according to an estimated difference between the compressed base layer video frames and estimated compressed base layer video frames associated with a second base layer bit rate greater than the pre-determined minimum rate.

* * * * *